United States Patent [19]
Wada et al.

[11] Patent Number: 5,177,420
[45] Date of Patent: Jan. 5, 1993

[54] METHOD OF AND APPARATUS FOR GENERATING CONTROL PROGRAM

[75] Inventors: Hiroaki Wada; Kunikazu Negishi, both of Sayama, Japan

[73] Assignee: Honda Giken Kogyo Kabushiki Kaisha, Tokyo, Japan

[21] Appl. No.: 516,742

[22] Filed: Apr. 30, 1990

[30] Foreign Application Priority Data

| May 1, 1989 | [JP] | Japan | 1-109089 |
| May 19, 1989 | [JP] | Japan | 1-127547 |
| May 19, 1989 | [JP] | Japan | 1-127548 |
| May 23, 1989 | [JP] | Japan | 1-130681 |
| Dec. 28, 1989 | [JP] | Japan | 1-342234 |
| Apr. 23, 1990 | [JP] | Japan | 2-107970 |

[51] Int. Cl.⁵ .......................... G05B 19/403
[52] U.S. Cl. .................. 318/568.11; 318/571; 318/568.1; 364/171; 364/191; 364/474.11
[58] Field of Search ............... 318/560–646; 364/136, 200, 900, 141, 474.11, 191, 474.01, 147, 168–172

[56] References Cited

U.S. PATENT DOCUMENTS

| 3,623,077 | 11/1971 | Clark | 340/347 DA |
| 4,432,047 | 2/1984 | Okayama | 364/147 |
| 4,441,161 | 4/1984 | Sasaki et al. | 364/900 |
| 4,688,193 | 8/1987 | Yamaoka et al. | 364/900 |
| 4,722,043 | 1/1988 | Nagamine et al. | 364/200 X |
| 4,876,664 | 10/1989 | Bittorf et al. | 364/900 |
| 4,888,726 | 12/1989 | Struger et al. | 364/900 |
| 4,972,365 | 11/1990 | Dodds et al. | 364/900 |
| 4,994,957 | 2/1991 | Komiya et al. | 364/147 |
| 5,005,152 | 4/1991 | Knutsen | 364/900 |
| 5,038,318 | 8/1991 | Roseman | 364/900 |
| 5,042,002 | 8/1991 | Zink et al. | 364/900 |
| 5,051,676 | 9/1991 | Seki et al. | 318/568.24 |

FOREIGN PATENT DOCUMENTS

| 0251699 | 1/1988 | European Pat. Off. |
| 58-158704 | 9/1983 | Japan |
| 59-158408 | 9/1984 | Japan |
| 60-41102 | 3/1985 | Japan |
| 60-164838 | 8/1985 | Japan |
| 62-281005 | 12/1987 | Japan |

OTHER PUBLICATIONS

German Publication "Nach Funktionsplanen Programmierbares Steuerungssystem" U. Maier; Elektrotechnische Zeitschrift, vol. 102, 1981.

*Primary Examiner*—Paul Ip

[57] ABSTRACT

A control program for controlling an object such as a machine tool, a robot, or the like is composed of an actuator program, a step program, and a logic program. The actuator program defines the input-output relationship of each actuator of the object based on a basic operation pattern. The step program defines the stepwise operation of said actuator. The logic program defines logic conditions such as an interlock condition.

10 Claims, 19 Drawing Sheets

FIG.6A

PATTERN FILE NAME : COMMON
NUMBER OF READ DATA : 5

| LEAD NO. | TYPE | LABEL | CONVERTED LABEL | LABEL CONV. FCT. | NUM. VALUE CONV. FCT. 39a |
|---|---|---|---|---|---|
| 1 | A | MST-ON | | | |
| 2 | A | AUTO | | | |
| 3 | A | PULSE | | | |
| 4 | A | PBA | | | |
| 5 | A | PBP | | | |

FIG.6B

PATTERN FILE NAME : ACT2-2
NUMBER OF READ DATA : 10

| LEAD NO. | TYPE | LABEL | CONVERTED LABEL | LABEL CONV. FCT. | NUM. VALUE CONV. FCT. 39b |
|---|---|---|---|---|---|
| 1 | A | COMMA | | | |
| 2 | A | COMMA | | | |
| 3 | A | MANU | | | |
| 4 | T | — | | | |
| 5 | A | LS-P | | | |
| 6 | A | LS-A | | | |
| 7 | A | SOL-P | | | |
| 8 | A | SOL-A | | | |
| 9 | A | INTP | | | |
| 10 | A | INTA | | | |

FIG.7

```
/**********************************************************/
/*UNIT = 02:TT-M/C        —ACTUATOR LIST—    */
/**********************************************************/
 {COMMON} /* MASTER ON       = */ 335
          /* COMMON : AUTO             = */ 338
          /* MASTER ON PULSE = */ 336
          /* SIGNAL : ACTIVE PB        = */ 10029
          /*        : PASSIVE PB       = */ 10030
/**********************************************************/
/* PATTERN * AUTO  * AUTO    * MANUAL *ACTUATOR NAME * PASSIVE I/O * ACTIVE I/O */
/*         * ADV.NO.* RET.NO.* NO.    *                                         */
/**********************************************************/
 {ACT2-2}  2017    2018      288     {TT-M/C CLAMP}} /* LS*/ 1001 /* LS*/ 1002 */
                                                    /* SOL*/ 1    /* SOL*/ 2   */
                                                    /* INTP*/ 1120 /* INTA*/ 1121 */
/*                                                                              */
 {ACT2-2}  2019    2020      289     {TT-M/C SWING}} /* LS*/ 1003 /* LS*/ 1004 */
                                                    /* SOL*/ 3    /* SOL*/ 4   */
                                                    /* INTP*/ 1122 /* INTA*/ 1123 */
/**********************************************************/
```

| BIT NO. | LABEL | STEP | | | | | | | |
|---|---|---|---|---|---|---|---|---|---|
| | | 3 | 4 | 5 | 6 | 7 | 8 | 9 | 10 |
| 0 | LS 1002 | 0 | 0 | 1 | 0 | 0 | 0 | 1 | 0 |
| 1 | 1001 | 1 | 0 | 0 | 0 | 1 | 0 | 0 | 0 |
| 2 | 1004 | 0 | 1 | 0 | 0 | 0 | 0 | 0 | 0 |
| 3 | 1003 | 0 | 0 | 0 | 0 | 1 | 0 | 0 | 0 |
| 4 | 1006 | 0 | 0 | 0 | 0 | 1 | 0 | 0 | 0 |
| 5 | 1005 | 0 | 1 | 0 | 0 | 0 | 0 | 1 | 0 |
| 6 | 1008 | 0 | 0 | 0 | 1 | 0 | 0 | 0 | 0 |
| 7 | 1007 | 0 | 0 | 0 | 0 | 0 | 0 | 0 | 0 |

| BIT NO. | LABEL | STEP | | | | | | | |
|---|---|---|---|---|---|---|---|---|---|
| | | 3 | 4 | 5 | 6 | 7 | 8 | 9 | 10 |
| 0 | SOL 002 | 0 | 0 | 1 | 0 | 0 | 0 | 1 | 0 |
| 1 | 001 | 1 | 0 | 0 | 0 | 1 | 0 | 0 | 0 |
| 2 | 004 | 0 | 1 | 0 | 0 | 0 | 0 | 0 | 0 |
| 3 | 003 | 0 | 0 | 0 | 0 | 1 | 0 | 0 | 0 |
| 4 | 006 | 0 | 0 | 0 | 0 | 1 | 0 | 0 | 0 |
| 5 | 005 | 0 | 1 | 0 | 0 | 0 | 0 | 1 | 0 |
| 6 | 008 | 0 | 0 | 0 | 0 | 0 | 0 | 0 | 0 |
| 7 | 007 | 0 | 0 | 0 | 0 | 0 | 0 | 0 | 0 |

| BIT NO. | LABEL | STEP | | | | | | | |
|---|---|---|---|---|---|---|---|---|---|
| | | 3 | 4 | 5 | 6 | 7 | 8 | 9 | 10 |
| 0 | 00250 | 1 | 0 | 0 | 0 | 0 | 0 | 0 | 0 |
| 1 | 00260 | 0 | 0 | 0 | 1 | 0 | 0 | 0 | 0 |

| BIT NO. | LABEL | INTERLOCK ADDRESS |
|---|---|---|
| | | IL2200 |
| 0 | SOL 002 | 0 |
| 1 | 001 | 0 |
| 2 | 004 | 0 |
| 3 | 003 | 0 |
| 4 | 006 | 0 |
| 5 | 005 | 0 |
| 6 | 008 | 1 |
| 7 | 007 | 0 |

62d

| LABEL | ADDRESS | COMMENT |
|---|---|---|
| LS1001 | 01001 | SWITCH1 |
| LS1002 | 01002 | SWITCH2 |

| INTERLOCK CONFIRMA-TION | | | 0 | 1 | 2 | 3 | 4 | 5 | 6 | 7 | 8 | 9 | 10 |
|---|---|---|---|---|---|---|---|---|---|---|---|---|---|
| | 00260 | | | | | | | | | | | | |
| | IL2200 | | | | | | | | | | | | |
| | 00250 | | | | | | | | | | | | |
| | ACTUATOR NAME | | | | | | | | | | | | |
| 1 | LIFT | ADV | 1,1,1,1,1 | 1,1,1,1,1 | | | | | 1,1,1,1,1 | 1,1,1,1,1 | 1,1,1,1,1 | 1, | |
| | | RET | | | 1, | 1,1,1,1,1 | 1,1,1,1,1 | 1,1,1,1,1 | | | | | |
| 2 | SHIFT | ADV | 1,1,1,1,1 | | | | 1, | 1,1,1,1,1 | 1,1,1,1,1 | 1,1,1,1,1 | 1,1,1,1,1 | 1,1,1,1,1 | 1,1,1,1,1 |
| | | RET | | | | 1,1,1,1,1 | 1,1,1,1,1 | | | | | | |
| 3 | SWING | ADV | 1,1,1,1,1 | | | 1, | 1,1,1,1,1 | 1,1,1,1,1 | 1,1,1,1,1 | | | | |
| | | RET | | | | | | | | 1,1,1,1,1 | 1,1,1,1,1 | 1,1,1,1,1 | 1,1,1,1,1 |
| 4 | UNLOAD CYL | ADV | 1,1,1,1,1 | 1,1,1,1,1 | 1,1,1,1,1 | 1,1,1,1,1 | 1,1,1,1,1 | 1, | | | | | |
| | | RET | | | | | | | 1,1,1,1,1 | 1,1,1,1,1 | 1,1,1,1,1 | 1,1,1,1,1 | 1,1,1,1,1 |

| INTERLOCK COMMAND CONFIRMATION OF INTERLOCK BETWEEN TASKS | STEP NO. | 0 | 1 | 2 | 3 | 4 | 5 | 6 | 7 | 8 | 9 | 10 |
|---|---|---|---|---|---|---|---|---|---|---|---|---|
| | STARTING TIME (SEC.) | 0 | 1 | 2 | 3 | 4 | 5 | 6 | 7 | 7 | 8 | 9 |
| | | -4 | -2 | -1 | 0 | 2 | 6 | IL2200 | 6 | 11 | 13 | 17 |
| | TIME INTERVAL (SEC.) | 0 | 0 | 0 | 2 | 4 | 2 | 7/0 | 8/3 | 2 | 4 | 2 |
| | | 0 | 0 | 0 | 0 | 0 | 0 | 0 | 0 | 0 | 0 | 0 |
| NAME | | | | | LIFT | SHIFT | LIFT | UNLOSD | 00260 | LIFT | | LIFT |
| LABEL | | | | | RETURN | ADVANCE | ADVANCE | ADVANCE | ON | RETURN | | ADVANCE |
| ADDRESS | | | | | YES | YES | YES | YES | YES | YES | | YES |
| STATUS | | | | | | | | | | | | |
| CONFIRMATION | | | | | | | | | | | | |
| | | 1 | 1 | 1 | 1 | 1 | 1 | 1 | 1 | 1 | 1 | 1 |
| NAME | | | | | 00250 | SWING | | | | SHIFT | | |
| LABEL | | | | | 00250 | RETURN | | | | RETURN | | |
| ADDRESS | | | | | 00250 | YES | | | | YES | | |
| STATUS | | | | | ON | | | | | | | |
| CONFIRMATION | | | | | YES | | | | | | | |
| | | 2 | 2 | 2 | 2 | 2 | 2 | 2 | 2 | 2 | 2 | 2 |
| NAME | | | | | | | | | | SWING | | |
| LABEL | | | | | | | | | | ADVANCE | | |
| ADDRESS | | | | | | | | | | YES | | |
| STATUS | | | | | | | | | | | | |
| CONFIRMATION | | | | | | | | | | | | |

METHOD OF AND APPARATUS FOR GENERATING CONTROL PROGRAM

BACKGROUND OF THE INVENTION

The present invention relates to a method or and an apparatus for generating a control program from an actuator program which describes operation patterns for an actuator to be controlled, a step program which describes step-wise operation of the actuator, and a logic program which describes logic conditions such as an interlock condition, controlling the actuator based on the generated control program, and displaying operating statuses based on the control program and a status signal from the actuator.

Generally, automatic apparatus such as machine tools, working robots, or the like are operated according to sequences described by control programs in order to reduce personnel required to attend to the apparatus and increase operation efficiency. A control program is executed by a programmable controller, which applies a command signal to the apparatus to be controlled. The apparatus then operates based on the command signal. After the apparatus has effected a required process, it transmits a detected signal from a limit switch or the like to the programmable controller. In response to the detected signal from the apparatus, the programmable controller executes the control program again and gives a next command signal to the apparatus.

Such a control program is usually generated as follows: Based on equipment specifications and timing charts, the system designer draws up a ladder diagram using relay symbols and other symbols, and then inputs the contents of the ladder diagram to the programmable controller, using a programming device of the programmable controller, for example, thereby generating a ladder program.

Drawing up of ladder diagrams requires the system designer to have professional knowledge with respect to sequence control. Modern apparatus to be controlled have a multiplicity of operational functions, and their control is highly complex. Safety control of the apparatus to provide against accidents due to oversights or unexpected accidents is also quite complex. Therefore, even a skilled system designer needs to expend a great deal of time and effort to draw up a ladder diagram.

Generated complex control programs are often required to be modified or corrected as they tend to contain many program errors. Such error-prone control programs also fail to provide desired control functions. When modifying or correcting a control program, it has been customary to directly modify or correct the ladder program in the programmable controller with the programming device, while reviewing a displayed ladder diagram. Accordingly, the original ladder diagram does not exactly reflect modifications or corrections of the ladder program, and hence the ladder diagram and the ladder program in the programmable controller are not identical. It is also very difficult to fully understand the entire program and to make proper program alterations based on the displayed ladder diagram. Problems frequently arise out of the above drawbacks.

In an attempt to eliminate the foregoing shortcomings, there has been proposed, as disclosed in Japanese Laid-Open Patent Publication No. 60(1985)-41102, a sequence control apparatus which can efficiently generate a new control program by linking an existing ladder as a subroutine program. In the proposed apparatus, absolute addresses are allotted to the contacts or the like of a patterned ladder. If the same ladder pattern is to be used, it is necessary to copy the ladder and address the contacts of the ladder. The operator is therefore required to carry out a tedious operation such as filing of a program.

There has also been proposed a method of inputting a timing chart and directly generating a control program from the timing chart. One such method is disclosed in Japanese Laid-Open Patent Publication No. 59(1984)-158408. According to the disclosed method, operation of an object to be controlled is inputted as a timing chart, and supplementary information such as timer commands, which are associated with the time-dependent sequence of the timing chart, is also inputted as a timing chart. Since, however, the operation of the object to be controlled and the supplementary information are inputted as independent timing charts, respectively, the process of inputting them is time-consuming and tedious. If the timing charts are used as specifications of a generated control program, they also cannot easily be understood.

Japanese Laid-Open Patent Publication No. 58(1983)-158704 discloses a method in which operation of an object to be controlled is inputting as a timing chart, and input and output addresses and interlock conditions corresponding to the timing chart are added. The disclosed method is highly complex since a plurality of pieces of supplementary information are added to the timing chart, and the timing chart cannot be easily be understood.

According to another proposed method, logic conditions are directly inputted according to a flowchart (see Japanese Laid-Open Patent Publication No. 60(1985)-164838). However, comments on the logic conditions cannot be indicated with respect to the inputted flowchart. Therefore, difficulty arises when the inputted logic conditions are to be decoded, and hence it is difficult to modify or correct a control program which has been generated. When the control program is altered, the original flowchart does not reflect the alteration of the control program, and does not agree with the control program in the programmable controller.

According to one arrangement, a ladder diagram is displayed on a display monitor to indicate the operation of an object to be controlled. Since only the ladder diagram is displayed, not everyone can immediately recognize which part of the object operates and what operation of the object is indicated, upon viewing the displayed ladder diagram. This scheme is therefore not easy and convenient to use.

One additional drawback is that programs vary according to different types of programmable controllers, and those produced by different types of programmable controllers are not compatible with each other.

Therefore, programmers have to generate different control programs which instruct different types of programmable controllers to do the same operation. Moreover, programmers have to understand commands used by control programs corresponding to different types of programmable controllers. As a consequence, professional programmers who are specifically trained to generate such control programs are required. If programming devices used to aid in producing control programs are dedicated for use with particular programmable controllers of different types, then these programming devices cannot easily and conveniently be used since their operation procedures differ from each other.

Japanese Laid-Open Patent Publication No. 62(1987)-81005 discloses a programming device which has a unified operation procedure for different types of programmable controllers. However, even the disclosed programming device is required to produce different control programs composed of instructions corresponding to the different types of programmable controllers, and the control programs thus produced are not compatible with each other.

SUMMARY OF THE INVENTION

It is an object of the present invention to provide a method and apparatus for efficiently generating, debugging, and monitoring a control program, while allowing an easy understanding of the status of operation of an object to be controlled.

Another object of the present invention is to provide a method of generating a control program, comprising the steps of generating an actuator program which defines the input/output relationship of each actuator of an object to be controlled, based on a basic operation pattern, generating a step program which defines the step-wise operation of the actuator, and generating a logic program which defines logic conditions such as an interlock condition, the control program being composed of the actuator program, the step program, and the logic program.

Still another object of the present invention is to provide a method of generating a control program, comprising the steps of setting basic operation patterns for actuators, setting, as definition parameters, attributes including the label names of elements of the basic operation patterns, selecting one of the basic operation patterns for an actuator of an object to be controlled, and thereafter setting up, as application parameters, input/output addresses with respect to the label names of the elements of the basic operation pattern.

Yet another object of the present invention is to provide an apparatus for generating a control program, comprising memory means for storing basic operation patterns for actuators and definition parameters as attributes including the labels of elements of the basic operation patterns, setting means for setting the basic operation patterns and the definition parameters, selecting one of the basic operation patterns for an actuator of an object to be controlled, and setting up, as application parameters, output/input addresses with respect to the label names of the elements of the basic operation pattern, and program editing means for editing a control program based on the basic operation pattern, the definition parameters, and the application parameters.

Yet still another object of the present invention is to provide an apparatus for generating a control program, comprising memory means for storing basic operation patterns for actuators and definition parameters as attributes including the labels of elements of the basic operation patterns, setting means for setting the basic operation patterns and the definition parameters, selecting one of the basic operation patterns for an actuator of an object to be controlled, and setting up, as application parameters, input/output addresses with respect to the label names of the elements of the basic operation pattern, program editing means for editing a control program based on the basic operation pattern, the definition parameters, and the application parameters, and supervising means for supervising the status of execution of the control program for the object.

A further object of the present invention is to provide a method of generating a control program, comprising the steps of setting a step pattern serving as an operation circuit for incrementing the steps of a control program, then setting up, as a timing chart, the step-wise operation of each actuator of an object to be controlled, and thereafter generating a control program based on time-series step-wise operation data obtained from the timing chart and the step pattern.

A still further object of the present invention is to provide an apparatus for generating a control program, comprising memory means for storing a step pattern serving as an operation circuit for incrementing the steps of a control program, setting means for setting the step pattern and also setting up, as a timing chart, the step-wise operation of each actuator of an object to be controlled, and program editing means for editing a control program based on the timing chart and the step pattern.

Another object of the present invention is to provide an apparatus for generating a control program, comprising memory means for storing a step pattern serving as an operation circuit for incrementing the steps of a control program, setting means for setting the step pattern and also setting up, as a timing chart, the step-wise operation of each actuator of an object to be controlled, program editing means for editing a control program based on the timing chart and the step pattern, and supervising means for supervising the status of execution of the control program for the object.

A yet still further object of the present invention is to provide a method of generating a control program, comprising the steps of setting input conditions composed of data including condition names, addresses, and status data, then setting up logic expressions including interlock expressions using the input conditions, and thereafter generating a control program from the logic expressions.

A still further object of the present invention is to provide a method wherein the input conditions are set up as an I/O table, and the logic expressions are set up using the I/O table.

It is also an object of the present invention to provide an apparatus for generating a control program, comprising setting means for setting input conditions composed of data including condition names, addresses, and status data and also setting up logic expressions including interlock expressions using the input conditions, and program editing means for editing a control program from the logic expressions.

Another object of the present invention is to provide an apparatus for generating a control program, comprising setting means for setting input conditions composed of data including condition names, addresses, and status data and also setting logic expressions including interlock expressions using the input conditions, program editing means for editing a control program from the logic expressions, and supervising means for supervising the status of execution of the control program for the object.

Still another object of the present invention is to provide an apparatus for generating a control program, comprising setting means for setting an operation sequence for an object to be controlled, converting means for converting the operation sequence into a control program for controlling the object, transmitting means for transmitting the control program to a sequence controller for controlling the object, receiving means for receiving a status signal from the object controlled by the control program, through the sequence controller, display means for displaying the operation sequence as an operation sequence diagram which includes a time-series display of each of steps of the object that is composed of a plurality of units and a relative display between the units, and for displaying the operation status of the object on the operation sequence diagram, and operation sequence diagram generating means for generating the operation sequence diagram from the operation sequence set by the setting means.

Yet another object of the present invention is to provide the apparatus wherein the display means comprises hierarchiacal display means for selectively or simultaneously displaying a first display including the steps in the units, a second display including operation details in the steps, and a third display including conditions/logics in the operation details.

Still another object of the present invention is to provide the apparatus wherein the operation sequence diagram generating means comprises operation sequence diagram data holding means for holding step-wise operation data of the units of the object which are arranged in data areas according to interlocks between the units.

Yet still another object of the present invention is to provide the apparatus further comprising editing means for editing the operation sequence diagram data and the step-wise operation data in the operation sequence data holding means according to the operation sequence diagram.

A further object of the present invention is to provide an apparatus for generating a control program, comprising program input means for entering a common control program with respect to a plurality of types of programmable controllers, command holding means for holding commands with respect to the types of programmable controllers, the commands corresponding to commands making up the control program, selecting means for selecting one type of programmable controller, command selecting means for selecting commands from the command holding means, which commands correspond to the selected type of programmable controller, and means for generating a control program for the selected type of programmable controller based on the commands selected by the command selecting means.

A still further object of the present invention is to provide the apparatus wherein the command holding means comprises means for holding a plurality of commands for a programmable controller which correspond to one macro command of the control program.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 6A and 6B are tables of definition parameters used in the generation of the actuator program;

FIG. 7 is a diagram showing an actuator list produced in the generation of the actuator program;

FIGS. 12A through 12D are tables of operation patterns used in the generation of the step program;

FIG. 16 is a diagram showing an operation pattern table produced in the step program;

FIG. 17 is a diagram of operation sequence diagram data produced according to an operation sequence diagram generating program;

DETAILED DESCRIPTION OF THE PREFERRED EMBODIMENT

Figure 1:
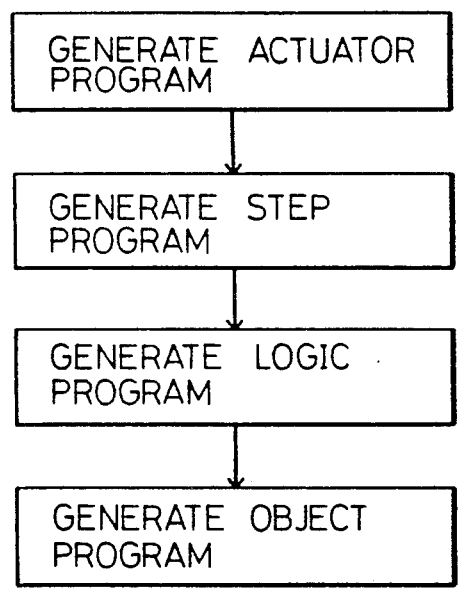
FIG. 1 is a schematic flowchart of a method of generating a control program according to the present invention.

FIG. 1 schematically shows the flowchart of a method of generating a control program according to the present invention. The method is generally composed of four steps. In the first step, an actuator program is generated on the basis of a basic operation pattern of an actuator of an object to be controlled. In the second step, step-wise operations of the actuator are set up to generate a step program. In the third step, logic conditions such as interlock conditions are set up to generate a logic program. In the fourth step, a program (object program) applicable to different types of programmable controllers is produced on the basis of ladder symbols and machine type data according to the actuator, step, and logic programs (source programs).

Figure 2:
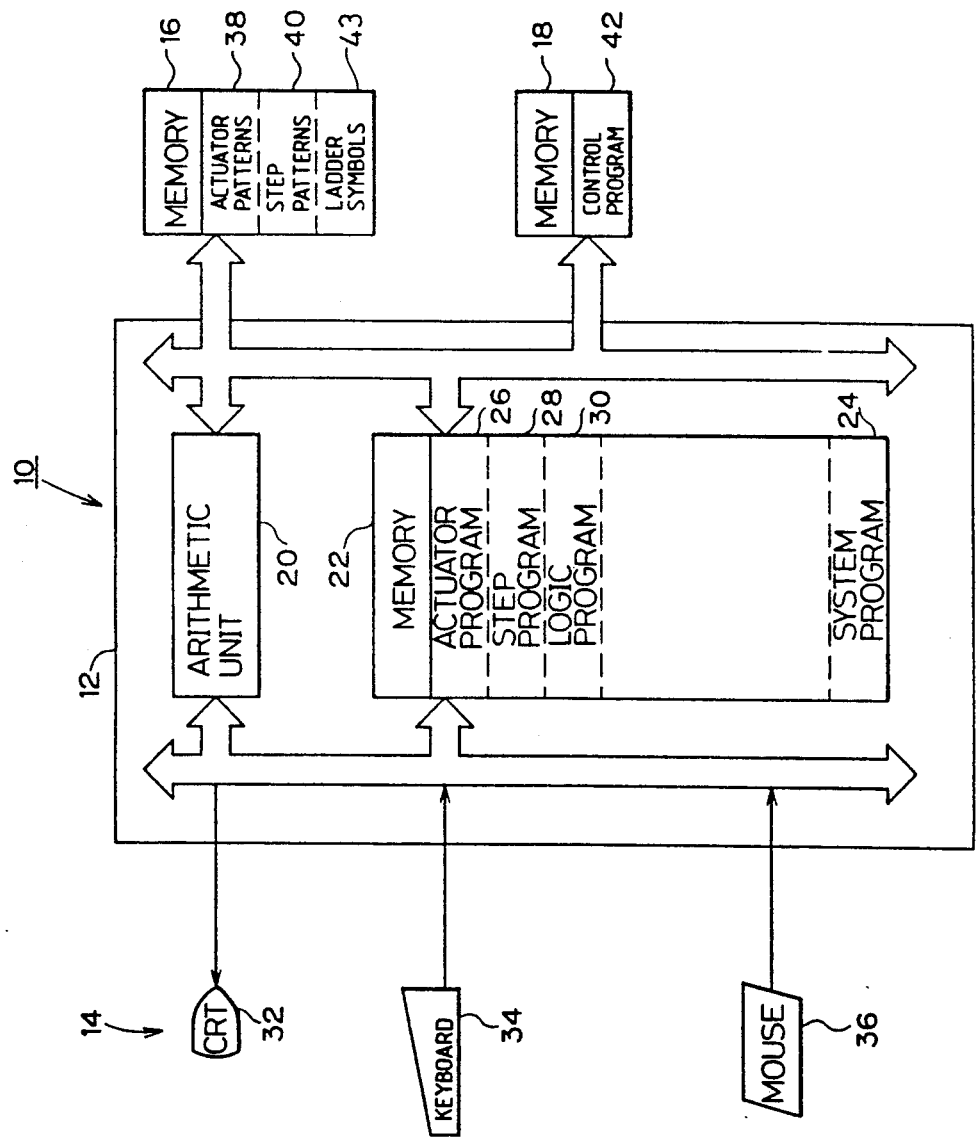
FIG. 2 is a block diagram of an apparatus for generating a control program according to the present invention.

FIG. 2 shows in block form a control program generating apparatus 10. The control program generating apparatus 10 comprises a main section 12, an interactive input/output section 14, and memories 16, 18.

The main section 12 includes an arithmetic unit 20 and a memory 22. The arithmetic unit 20 controls the interactive input/output section 14 and the memories 16, 18. The memory 22 stores a system program 24 for controlling operation of the arithmetic unit 20, and also stores an actuator program 26, a step program 28, and a logic program 30 which are generated in the first through third steps described above. The interactive input/output section 14 has a CRT display 32 with a graphic information processing capability, a keyboard 34. and a mouse 36 which controls the cursor and selects the functions of the CRT display 32. The interactive input/output section 14 is used to produce and correct the actuator program 26, the step program 28, and the logic program 30, and also to monitor these programs as they are run under the control of the arithmetic unit 20.

The memory 16 serve to store actuator patterns 38 in the form of ladders which define basic operation patterns for actuators of an object to be controlled, such as a machine tool or the like, and step patterns 40 which are basic step-wise operation patterns for the actuators. The memory 16 also serves as a command holding means for holding macro commands which are individual commands making up common source programs, and one or a plurality of ladder symbols 43 which are minimum commands of various types of programmable controllers, each of the macro commands being made up of plural ladder symbols. These patterns 38, 40 may be generated by the arithmetic unit 20.

The memory 18 stores a control program 42 which is generated using the ladder symbols 43, from the actuator program 26, the step program 28, and the logic program 30.

Figure 3:
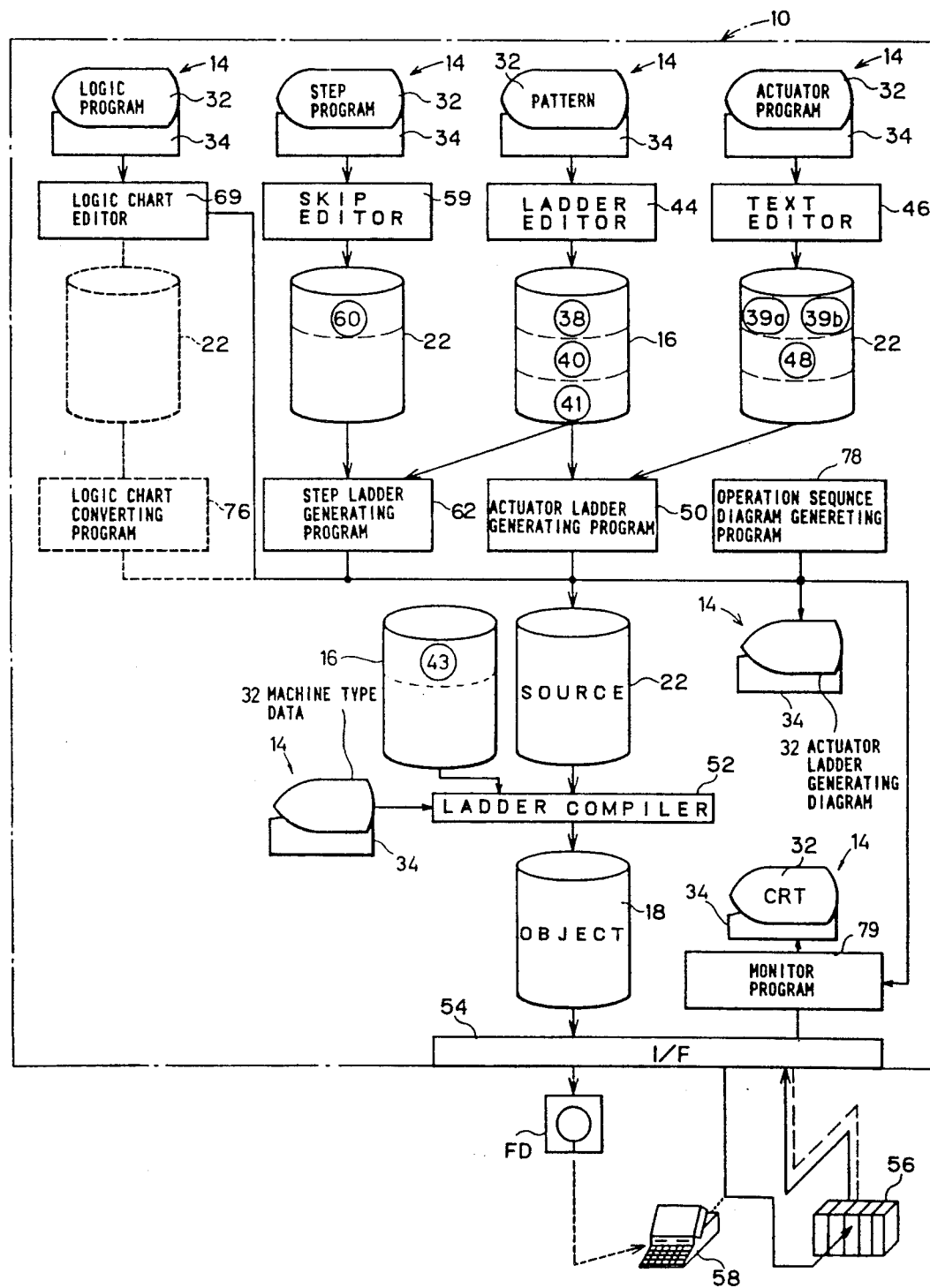
FIG. 3 is a diagram showing the sequence procedure of the method of the present invention.

FIG. 3 shows the control program generating apparatus 10 in greater detail, in combination with a procedure for generating a program. A method of generating the control program 26 will now be described with reference to FIG. 3.

Before the control program is generated, a programming language applicable to the control program generating apparatus 10 is registered as part of a system program 24, and ladder symbols 43 corresponding to a plurality of different programmable controllers to which the control program to be generated by the control program generating apparatus 10 are also registered. Ladder symbols 43 corresponding to one of different types of programmable controllers may correspond to commands in 1 : 1 correspondence, or may correspond to one command. If plural adder symbols 43 correspond to one command, such a command may be registered as a macro command.

Figure 4:
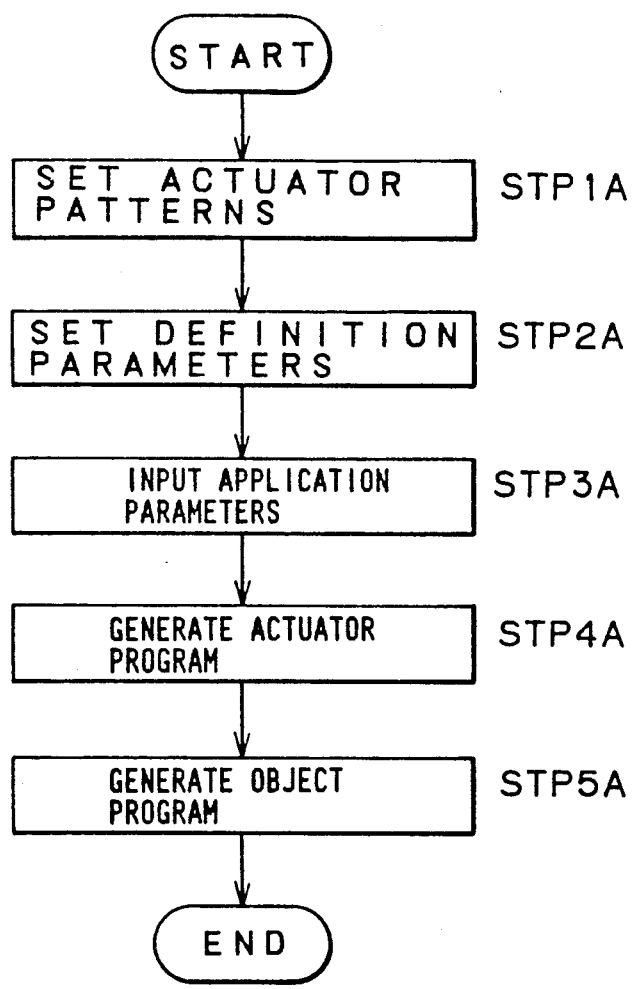
FIG. 4 is a flowchart of a process for generating an actuator program.

After the above preparatory process is finished, the control program designer now generates the control program using the control program generating apparatus 10 (see FIG. 4).

The control program designer selects an actuator program generating mode through the keyboard 34, and enters data necessary to generate the actuator program 26 according to specifications and requirements of an object to be controlled, which are set up by the system designer.

Prior to the generation of the actuator program 26, an actuator pattern 38 (see FIG. 5) which is a basic operation pattern for an actuator and definition parameters 39a, 39b (see FIGS. 6A and 6B) are set up in steps 1A and 2A in FIG. 4. The actuator pattern 38 is in the form of a ladder program indicative of the basic operation pattern for the actuator, with labels representing the functions of contacts, coils, registers, etc. Actuator patterns 38 thus generated with pattern file names given to respective actuators are stored in the memory 16. If no actuator pattern 38 for the actuator which is to be controlled is preset, then the control program designer can generate a desired actuator pattern 38 through the interactive input/output section 14, using a ladder editor 44 of the system program 24, and store the generated actuator pattern 38 in the memory 16.

The definition parameters 39a, 39b are parameters which define the relationship between the actuator pattern 38 and application parameters (described later). The definition parameters 39a, 39b are set up as shown in FIGS. 6A and 6B and stored in the memory 16. The definition parameters 39a are shared by the various actuator patterns 38, and are stored in the memory 16 under a pattern file name COMMON allotted thereto. The definition parameters 39b are related to the actuator pattern which is identified with a pattern file name ACT2-2. In FIGS. 6A and 6B, "TYPE" indicates whether the data are a constant C, or an address A, or a character string T., "CONVERTED LABEL" indicates the converted name of the label used by the actuator pattern 38, "LABEL CONVERSION FUNCTION" indicates a function for converting the name of a label according to a prescribed rule and automatically setting up the converted label name when the same actuator pattern 38 is used in setting up application parameters (described later), and "NUMERICAL VALUE CONVERSION FUNCTION" indicates a function for converting a label into a numerical value and allotting the numerical value according to a prescribed rule. If any definition parameters 39a, 39b are not preset with respect to the actuator pattern 38, they can be generated using a text editor 46 of the system program 24.

Then, the control program designer enters application parameters based on the text editor 46 of the system program 24 in a step 3A. More specifically, the control program designer selects the actuator patterns 38 corresponding to actuators in each unit to be controlled, and sets up the input/output addresses of a sequence controller (described later), using the interactive input/output section 14. FIG. 7 shows an actuator list 48 which is displayed on the CRT display 32 after the application parameters have been entered. The actuator list 48 shows the relationship between the actuators with prescribed operation patterns in one unit (TT-M/C) and the input/output addresses. The unit (TT-M/C) has two actuators each having an actuator pattern 38 whose pattern file name is ACT2-2 (see FIG. 5). Input/output addresses 1001, 1002, so on are given to the contacts, coils, registers, etc. of each of the actuators. The object to be controlled is a collection of such units, and the actuator list 48 is prepared for each of the units.

Using the actuator pattern 38 (FIG. 5), the definition parameters 39a, 39b (FIGS. 6A and 6B), and the application parameters (FIG. 7), actuator programs 26 are generated in the form of logic expressions, for example, based on an actuator ladder generating program 50 which serves as a program editing means of the system program 24, in a step 4A.

Figure 8:
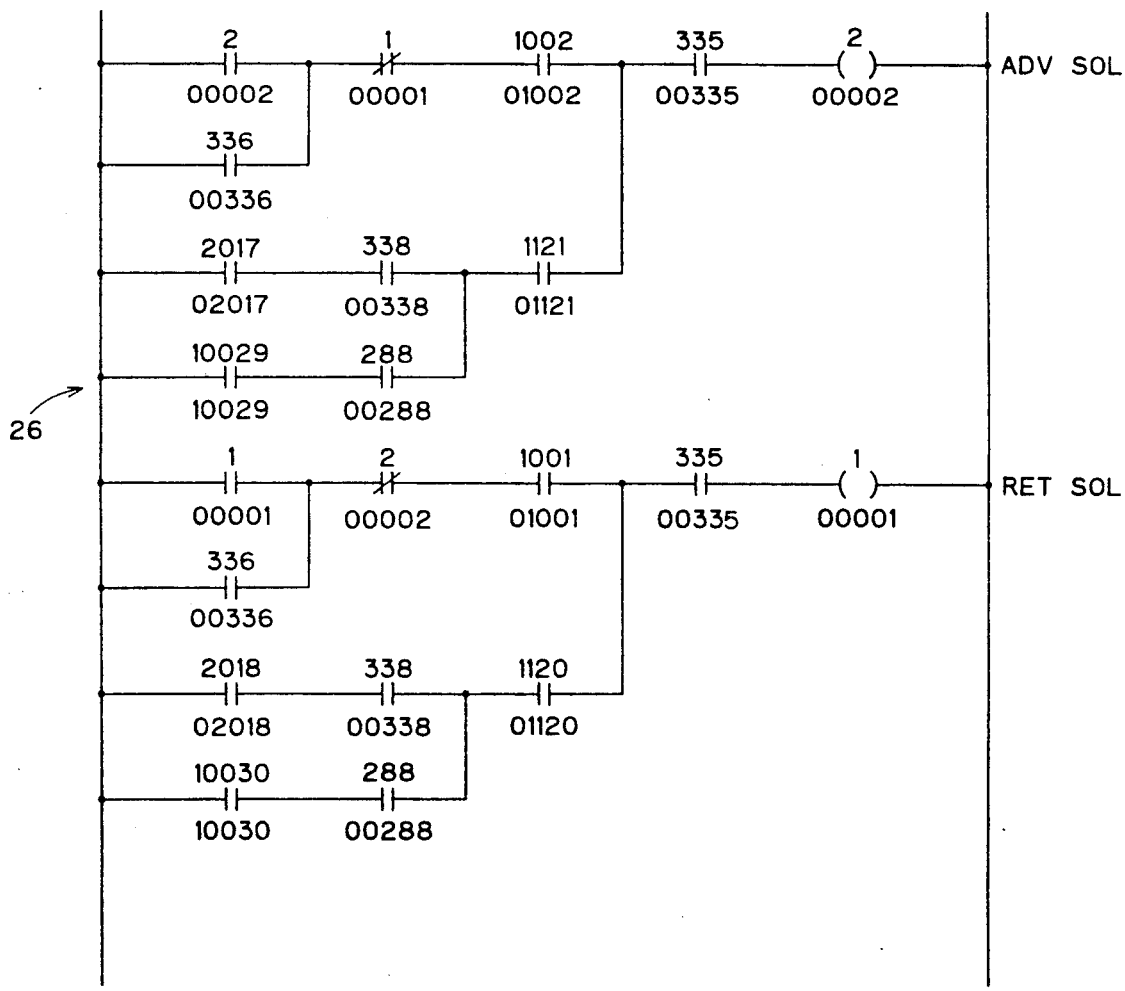
FIG. 8 is a diagram showing an actuator program.

FIG. 8 illustrates one of the actuator programs 26, which has an actuator name {TT-M/C CLAMP1}, the actuator program 26 being generated using the definition parameters 39a, 39b shown in FIGS. 6A and 6B and the application parameters shown in FIG. 7. To the contacts and coils indicated by the actuator program 26, there are allotted label names (upper numerals) set up as the application parameters, and addresses (lower numerals) determined by the definition parameters 39a, 39b. Since no label conversion function is established with respect to the definition parameters 39a, 39b, the label names and the addresses are identical. The actuator program 26 whose actuator name is {TT-M/C SWING1} is similarly generated using the application parameters shown in FIG. 7.

Figure 5:
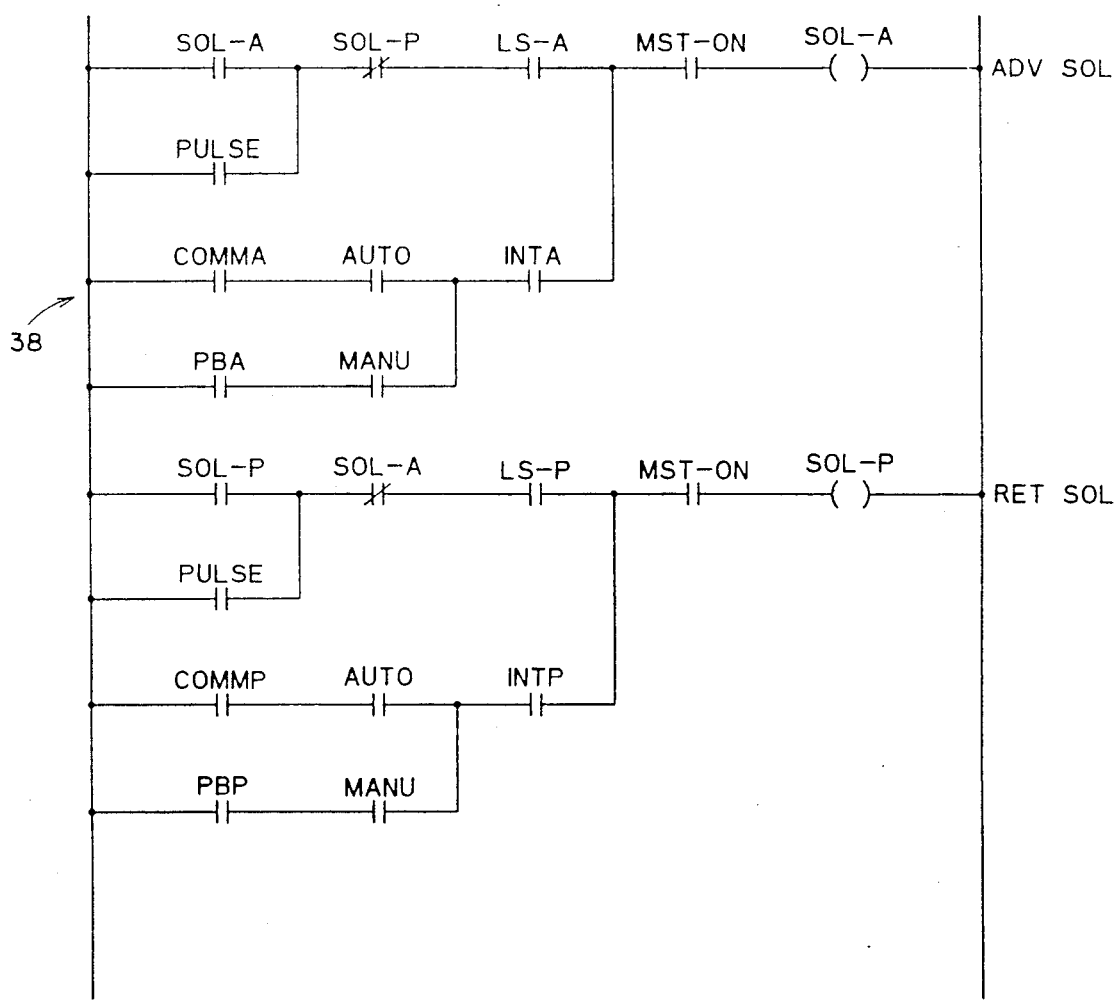
FIG. 5 is a diagram showing an actuator pattern used in the generation of the actuator program.

In the illustrated embodiment, therefore, the actuator programs 26 can be generated from the same actuator pattern 38 shown in FIG. 5, using the definition parameters 39a, 39b (FIGS. 6A and 6B) and the application parameters (FIG. 7).

If a basic actuator pattern 38 is given in advance, therefore, actuator programs 26 can be generated easily and accurately in a short period of time. The addresses for labels (LS-A, SOL-A, etc.) which are given to the elements of the actuator pattern 38 are relocatable by the definition parameters 39a, 39b and the application parameters, an actuator program 26 can easily be generated using a plurality of actuator patterns 38 of one kind.

The actuator program 26 thus generated is converted into an object program by a ladder compiler 52 in a step 5A, and the object program is transferred to a sequence controller 56 through an interface 54. The actuator program 26 may directly be loaded into the sequence controller 56 by a communication link, but may also be loaded into the sequence controller 56 from a programming panel 58 through a floppy disk FD.

Figure 9:
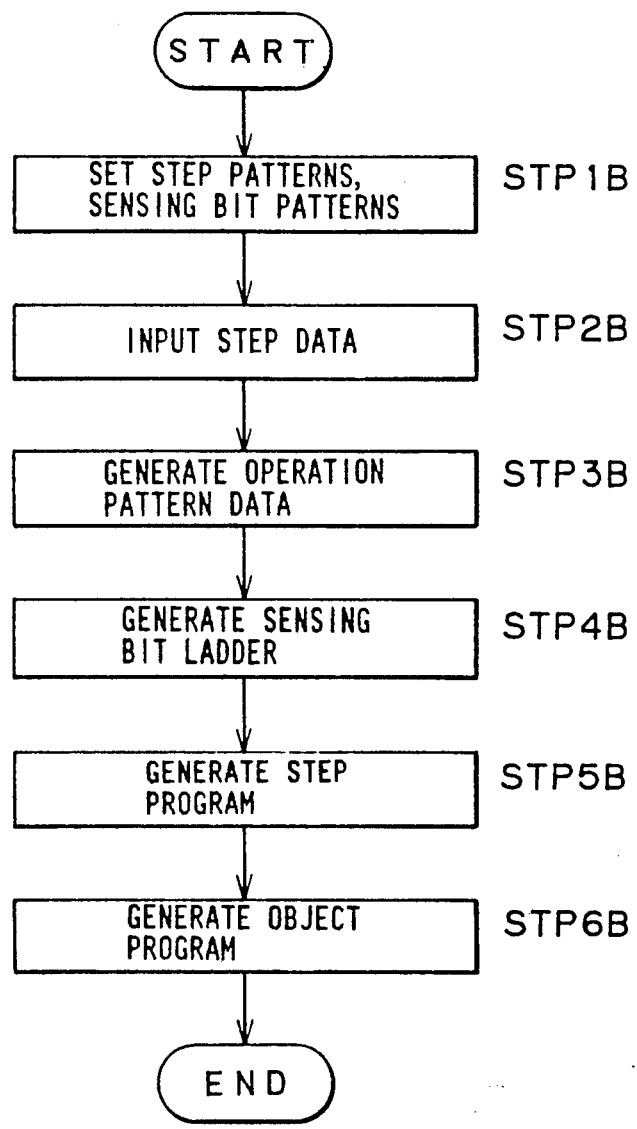
FIG. 9 is a flowchart of a process for generating a step program.

A process of generating the step program 28 will be described below with reference to the flowchart of FIG. 9.

Figure 10:
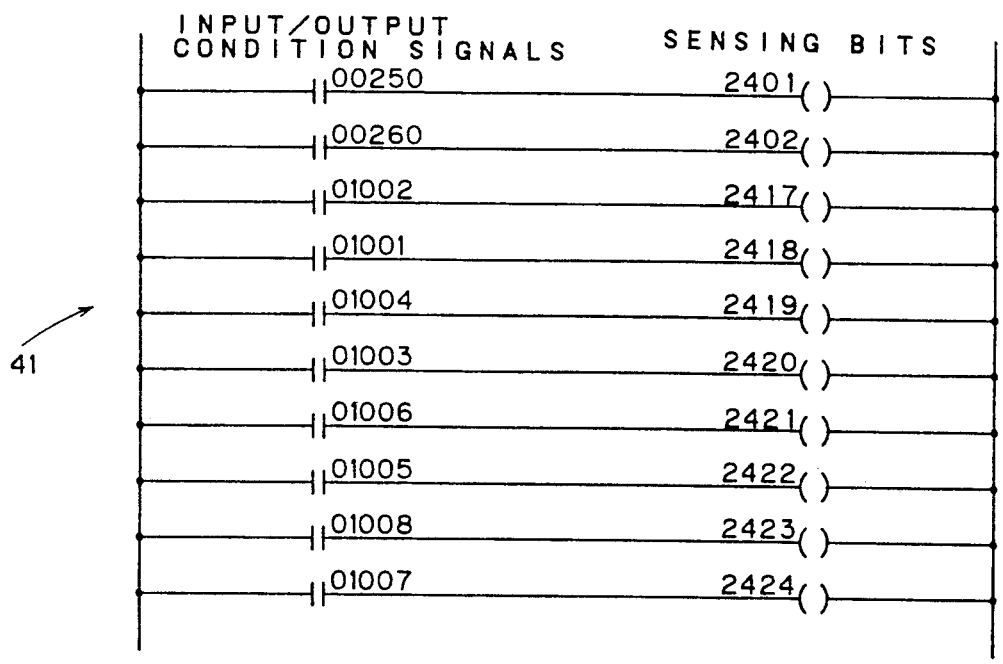
FIG. 10 is a diagram showing a sensing bit ladder used in the generation of the step program.

Before the step program 28 is generated, a step pattern 40 and a sensing bit pattern 41 (see FIG. 10) are set up in a step 1B. The step pattern 40 is equivalent to an operation circuit, set up as a ladder program, for incrementing the steps of a control program. For example, the step pattern 40 includes a transfer ladder for transferring the data contained in a step register and an interlock register in the sequence controller 56 to a work register, a condition comparison ladder for comparing the status of sensing bits and interlock conditions, a step-up ladder for incrementing the steps, an external command output ladder for outputting a command signal when the data in the step register reach a desired step, an interlock ladder for writing interlock command data as the step command output in the work register when an interlock signal is turned on, and a command output ladder for outputting command data in the work register to a commanded coil. The sensing bit pattern 41 is a program for replacing addresses in which input conditions from the object to be controlled are set, with successive addresses in an internal register. For example, input/output condition signals set at random addresses are allotted to sensing bits at successive addresses, as shown in FIG. 10. The step pattern 40 and the sensing bit pattern 41 are stored in the memory 16. However, the step pattern 40 and the sensing bit pattern 41 may be set up using the ladder editor 44, as when the actuator pattern 38 is generated.

Figure 11:
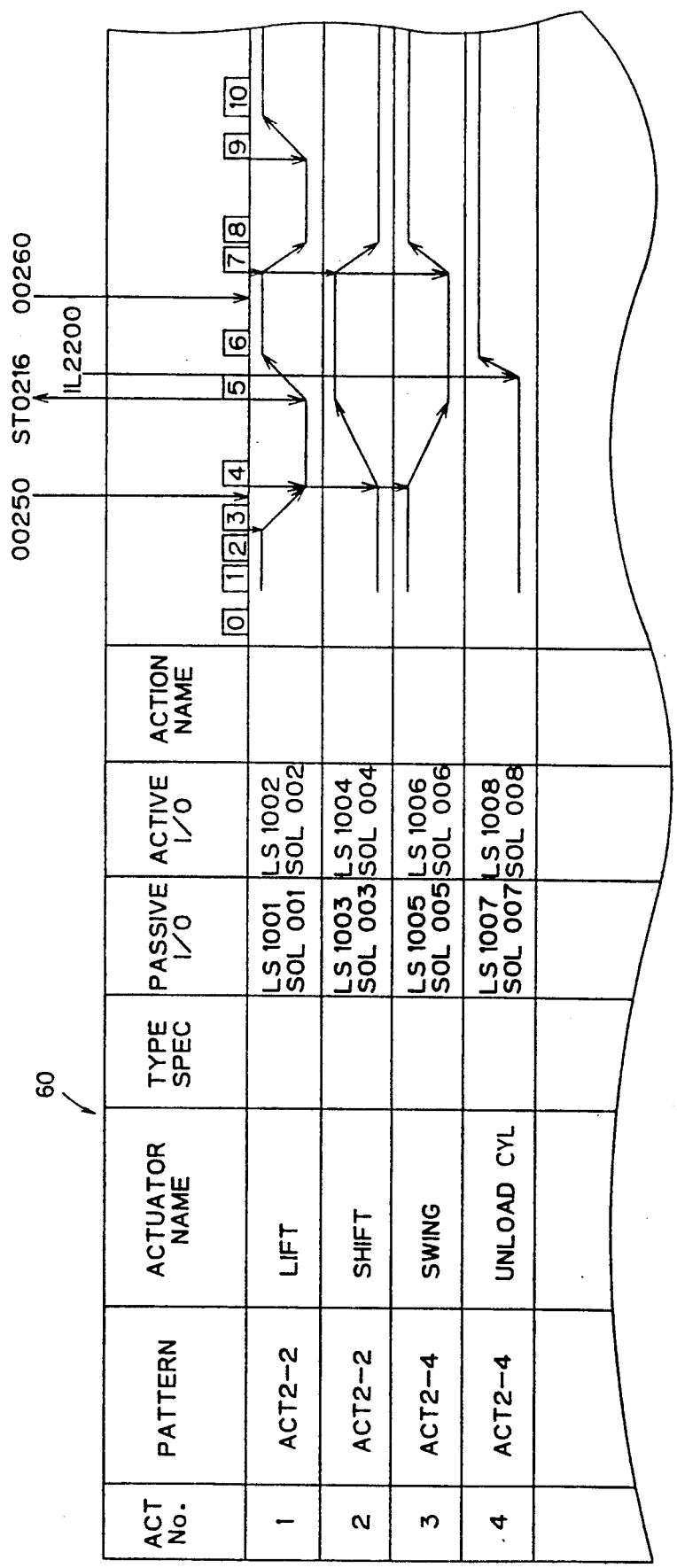
FIG. 11 is a diagram showing step data used in the generation of the step program.

The control program designer selects a step program generating mode using the interactive input/output section 14, and thereafter enters step data 60 shown in FIG. 11 through the keyboard 34, using a step editor 59 of the system program 24, in a step 2B. More specifically, the control program designer enters, using the graphic information function, pattern file names (such as ACT2-2) of the actuator patterns 38 which are set up when the actuator programs 26 of each unit of the object to be controlled are generated, the names of the actuators, the label names of LS and the like for detecting the status of operation of the actuators, the label names of solenoids and the like for driving the actuators, timing charts for the actuators, step incrementing conditions, and interlock conditions, as shown in FIG. 11.

Then, the arithmetic unit 20 of the control program generating apparatus 10 generates an operation pattern table based on a step ladder generating program 62 of the system program 62 in a step 3B. The operation pattern table is composed of the step data 60 entered as shown in FIG. 11, which are organized into a step incrementing condition table 62a (FIG. 12A), a step command output table 62b (FIG. 12B), an interlock input condition table 62c (FIG. 12C), an interlock command output table 62d (FIG. 12D), and an external output table (not shown). The step incrementing condition table 62a contain data for the respective labels at the time the status of the actuators vary as represented by the step data 60. The step command output table 62b contains data for giving operation commands to the actuators. The interlock input condition table 62c contains interlock input conditions which are set up by a logic program 30 (described later on). The interlock command output table 62d contains data for outputting interlock commands to the logic program 30. The external command output table contains data for outputting the status of the actuators to an external device. The data contained in the external command output table correspond to STO 216 which is indicated by the arrow in the step data 60 shown in FIG. 11.

Then, based on the data in the operation pattern table thus set up, a sensing ladder composed of the sensing bit pattern 41 set up in step 1B and a condition register are generated. The sensing ladder is set up such that the step data 60 are set up as shown in FIG. 10. When the step data 60 are as shown in FIG. 11, in step 4B. The data contained in the operation pattern table are set up in an internal register of the preset step pattern 40, thus completing the step program in a step 5B.

In the above embodiment, as described above, the step data 60 are entered as shown in FIG. 11, and the step program 28 is generated using the step pattern 40 and the sensing bit pattern 41. The operator can generate the step program simply by setting up the timing chart of each actuator based on the relationship thereof to input/output addresses. Therefore, the step program 28 can be generated easily and accurately within a short period of time. Since conditions such as interlock conditions between the actuators can be set up when entering the step data 60, the step program 28 is generated with greater ease.

As with the actuator program 26, the step program 28 is then converted into an object program by the ladder compiler 52 in a step 6B, and the object program is transferred through the interface 54 to the sequence controller 56 (see FIG. 3).

A process of generating the logic program 30 will be described below with reference to the flowchart of FIG. 13. The control program designer now selects a logic program generating mode with the interactive input/output section 14.

Figures 13, 14:
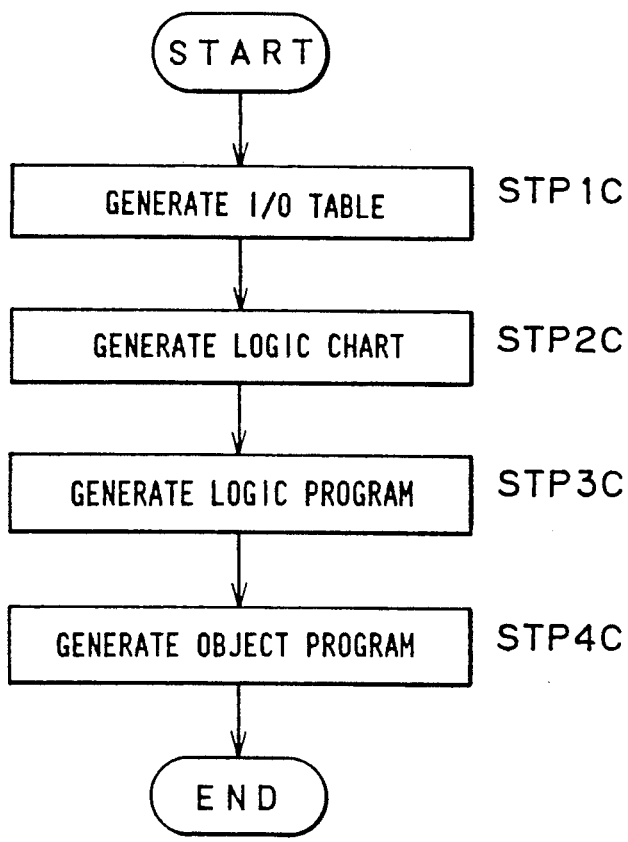
FIG. 13 is a flowchart of a process for generating a logic program.
FIG. 14 is a diagram showing an I/0 table used in the generation of the logic program.

First, as shown in FIG. 14, the control program designer generates an I/0 table 66 which indicates the relationship between the label names of limit switches and the like which are entered when generating the step program 28, the addresses thereof, and comments indicating the details of the label names, in a step 1C. Then, using a logic editor 69, the control program designer enters a logic chart 68 indicative of logic conditions such as interlock conditions shown in FIG. 15 through the keyboard 34.

The logic chart 68 includes blocks 70 each comprising a comment area 72a, a label area 72b, and an address area 72c. A comment as a condition and a label are set up in the comment area 72a and the label area 72b. The block 70 represents an output coil and is displayed in a coil output region 74a. The logic chart 68 also includes blocks 76 each comprising a label area 78a, an address area 78b, and a status area 78c which indicates the ON/OFF status of a limit switch or the like corresponding to the label in the label area 78a. The block 76 represents an input condition such as an interlock condition, and is displayed in a condition setting region 74b. The logic chart 68 further includes a message area 81 in its uppermost portion. The blocks 70, 76 are indicated by combinations of logical products connected in series downwardly on the display screen and logical sums connected parallel rightwardly on the display screen. As a whole, the logic chart 68 is established as a downward flowchart. Plural logic expressions indicated by the blocks 70 can be displayed on the screen. When entering the blocks 70, 76, since combinations of data of the label areas 72b and the data of the address areas 72c are determined by the I/0 table 66 which is set up in the step 1C, only either labels or addresses may be entered.

The logic chart 68 thus entered is converted into a logic program 30 by a logic chart converting program 76 of the system program 24, in a step 3C. After the logic program 30 is converted into an object program by the ladder compiler 52 in a step 4C, it is transferred through the interface 54 to the sequence controller 56 as with the actuator program 26 and the step program 28. The logic chart 68 may also be converted into a logic program 30 in the form of logic expressions by the logic chart converting program 76 in the step 3C.

Figure 15:
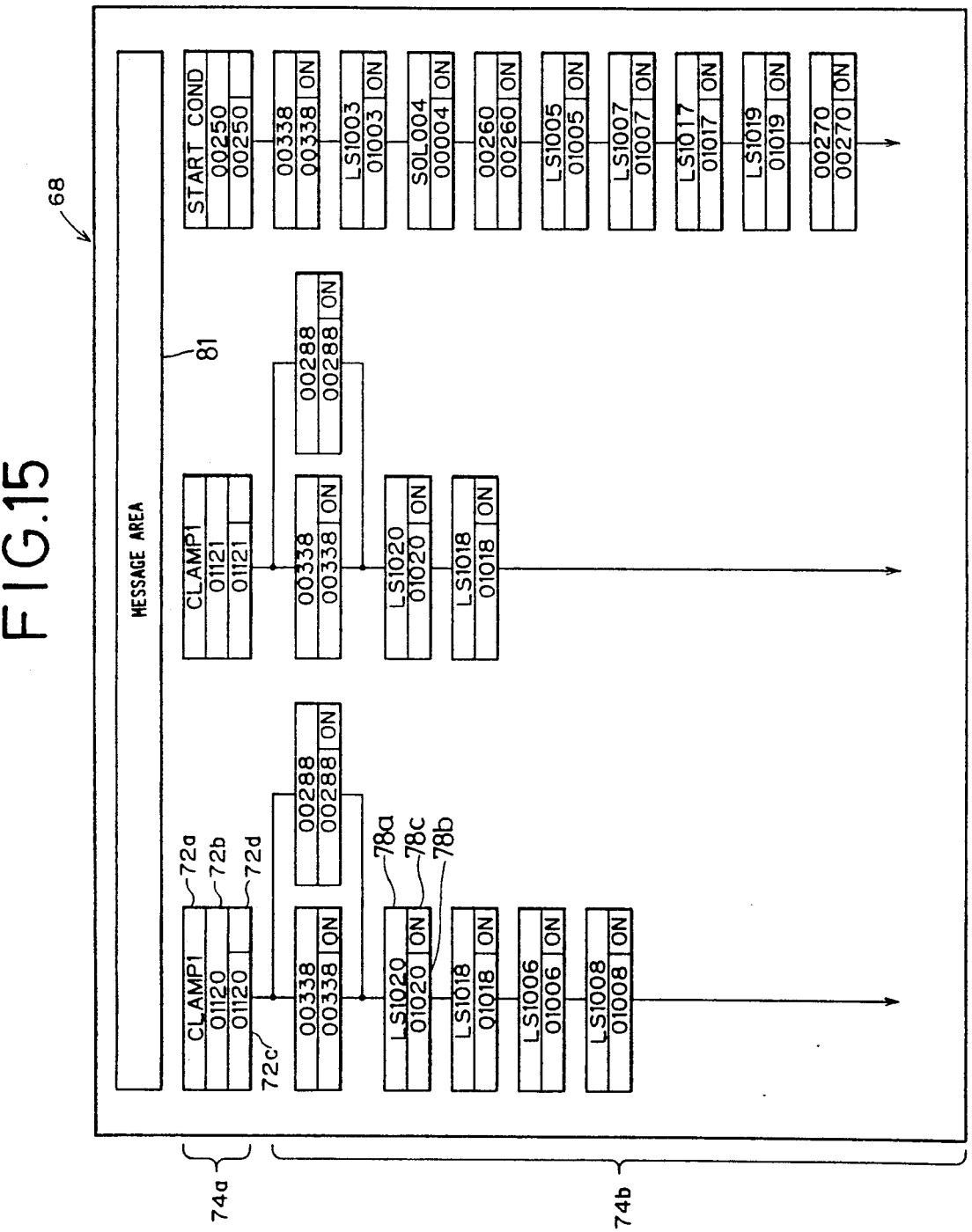
FIG. 15 is a diagram showing a logic chart used in the generation of the logic program.

In the above embodiment, as shown in FIG. 15, logic expressions such as interlock logic expressions are entered by way of a flowchart, and they are converted into the logic program 30 using the logic chart converting program 76. The contents of the logic expressions can be displayed as comments in the comment areas 72a in the blocks 70 in the logic chart 68 which is composed of logic expressions. In the label areas 72a, 78a in the blocks 70, 76, there can be displayed desired labels corresponding to the names of LS and the like separately from the addresses displayed in the address areas 72c, 78b. Therefore, the programmer can easily set up logic expressions according to these comments and labels. The logic chart 68 is arranged such that the processing sequence thereof flows downwardly on the display screen. Therefore, the logic chart 68 can be generated more easily by a programmer who is used to the generation of flowchart-type control programs.

A desired control program 42 which is composed of object programs is now stored in the sequence controller 56. Instead of transferring the actuator program 26, the step program 28, and the logic program 30 independently to the sequence controller 56 through the communication link, they may be transferred *en masse* to the sequence controller 56. In the aforesaid three steps of generating the actuator program 26, the step program 28, and the logic program 30, source programs are first generated using the system program 24 and then converted into object programs. However, object programs may directly be generated.

The sequence controller 56 controls operation of the object such as a working robot or the like based on the control program thus generated.

The programs 26, 28, 30 may be generated using common commands shared by different types of programmable controllers 56. A procedure for generating the programs in such a fashion will be described below. First, the control program designer enters the data on the type of the programmable controller 56 connected to the control program generating apparatus 10, using the interactive input/output section 14.

The arithmetic unit 20 successive reads the source programs, i.e., the actuator program 26, the step program 28, and the logic program 30, stored in the memory 22, and also reads ladder programs 43 corresponding to the commands of the source programs from the memory 16 based on the type data, and converts the source programs into a ladder program which corresponds to the programmable controller 56. The commands of the source programs are macro commands. A unit ladder program composed of one or more commands of the programmable controller 56 which correspond to the macro commands is selected, and the ladder program is generated according to the unit ladder program. Then, the ladder compiler 52 converts the ladder program into an object program, which is then stored in the memory 18 as a control program 42 corresponding to the programmable controller 56.

The control program 42 may be loaded directly into the programmable controller 56 through a communication link, or loaded from the floppy disk FD into the programmable controller 56 through the programming panel 58.

Based on the control program 42, the programmable controller 56 controls operation of the object such as a working robot or the like. The control program generating apparatus 10 detects the status of operation of the object as an I/0 status through the programmable controller 56 and the interface 54, and displays the detected operation status on the CRT display 32 through a monitor program 79 on a real-time basis. Therefore, the operator can always supervise the operation status of the object on the CRT display 32.

For example, the actuator list 48 shown in FIG. 7 may be displayed on the CRT display 32, and the label or the like of the element of the actuator which is being executed may be blinked on the basis of the data obtained from the sequence controller 56 through the interface 54. In this manner, the operation status of the object can be supervised at all times. The operator can now determine whether an error has occurred in control program based on the displayed operation status, and can correct the control program if necessary. A process for correcting the control program can easily be carried out based on the actuator list 48.

When the step data 60 shown in FIG. 11 are displayed on the CRT display 32 and the step number which is being executed is blinked on the basis of the data obtained from the sequence controller 56 through the interface 54, the operation status of the object can be supervised at all times. The operator can now determined whether an error has occurred in the control program based on the displayed operation status, and can correct the control program if necessary. The correcting process can also easily be carried out based on the displayed step data 60 shown in FIG. 11.

When the logic chart 68 shown in FIG. 15 is displayed on the CRT display 32 and the blocks 70, 76 which are being executed are blinked on the basis of the data obtained from the sequence controller 56 through the interface 54, the operation status of the object can be supervised at all times. The operator can now determined whether an error has occurred in the control program based on the displayed operation status, and can correct the control program if necessary. The correcting process can also easily be carried out based on the displayed logic chart 68.

The status signal representing the operation status of the object is processed by an operation sequence diagram generating program 78, and monitored as an operation sequence diagram on the CRT display 78 on a real-time basis.

A process of generating an operation sequence diagram will now be described below. FIG. 16 shows a portion of an operation pattern table 80 of the step program 28 relative to one unit of the object to be controlled, the operation pattern table 80 being generated on the basis of the step data 60 set up as shown in FIG. 10. The operation pattern table 80 is stored in the memory 22. For example, the operation pattern table 80 is set up such that the confirmation of an interlock indicated as "00250" in a step 3 is set up as "1", and during a shift from a step 2 to the step 3, an actuator indicated by "LIFT" varies ("1"⟵⟶"0") from an advanced condition (ADV) to a retracted condition (RET).

The operation sequence diagram generating program 78 generates operation sequence diagram data 82 shown in FIG. 17 from the operation pattern table 80 shown in FIG. 16. The operation sequence diagram data 82 have data areas 84 holding block data for the respective steps of the actuators. Each of the data areas 84 is divided into items such as of an interlock command, confirmation of interlock between tasks, a step number, a starting time, a time interval, the name, label, address, status, and confirmation of a corresponding actuator. The label, address, and status correspond respectively to data which are set up in the label area 72b, the address area 72c, and the status area 72d in the logic chart 68. In the step 3 shown in FIG. 16, for example, a command for the advanced condition (ADV) of an actuator indicated by "LIFT" varies from "1" to "0", and a command for the retracted condition "RET" varies from "0" to "1". Therefore, data relatively to "LIFT" are set up in the third data area 84. Interlock data indicated by "00250" are also set up in this data area 84. When the other data are also set up, the operation sequence diagram data 82 shown in FIG. 17 are generated.

Figure 18:
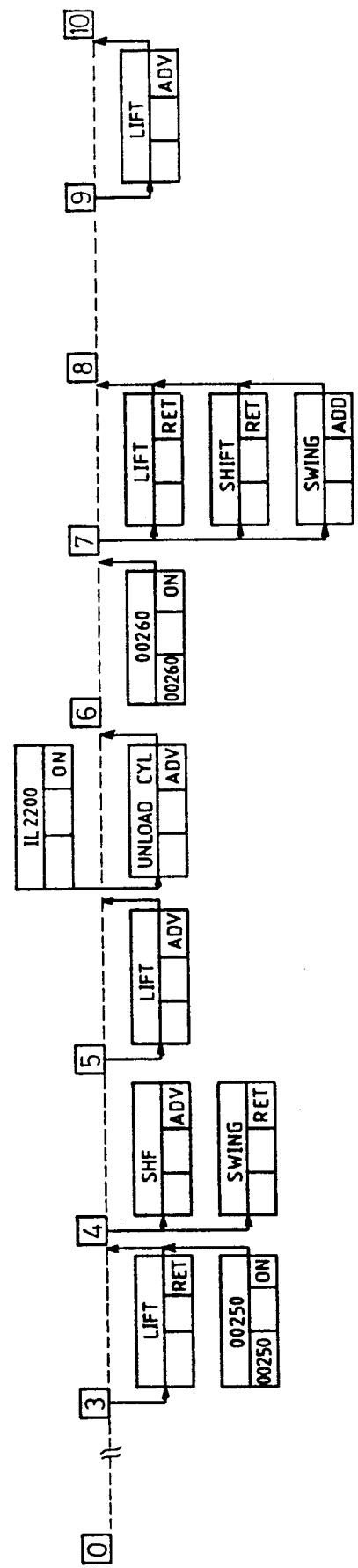
FIG. 18 is a diagram of an operation sequence diagram which is displayed according to the operation sequence diagram generating program.

Then, the operation sequence diagram generating program 78 generates an operation sequence diagram 86 shown in FIG. 18 based on the operation sequence diagram data 82, and displays the operation sequence diagram 86 on the CRT display 32. The operation sequence diagram 86 represents the operations of a unit (TT-M/C) in respective steps in a time-series fashion. The respective steps display blocks 70, for example, which indicate the operation status in the logic chart 68 (FIG. 15). Therefore, the operator can easily understand the flow of the control program based on the operation sequence diagram 86. The operation sequence diagram 86 shown in FIG. 18 indicates only the flow of the control program with respect to one unit of the object to be controlled. However, the operation sequence diagram 86 may also simultaneously indicate the flow of the control program with respect to another unit. Therefore, the operator can relatively understand the flows of the control programs with respect to different units.

The operator can also monitor the operational status of the object to be controlled, on a real-time basis, using the operation sequence diagram 86.

More specifically, the data relatively to the operation status of the object have been transferred to the control program generating apparatus 10 through the interface 54. The monitor program 79 updates the data of the "status" in the operation sequence diagram data 82, and displays the updated status on the operation sequence diagram 86 on a real-time basis, using the operation sequence diagram generating program 78. If the step number, for example, which is being executed is blinked, then the operation status of the object can always be supervised. Based on the displayed status, the operator can determine whether an error has occurred in the control program and can correct the control program, if necessary.

The operation sequence diagram generating program 78 also functions as an editing means for editing the data of the operation sequence diagram data 82 and the operation pattern table 80 (see FIG. 16). More specifically, the operator enters data relative to a correction of an operation sequence through the keyboard 34 according to the operation sequence diagram 86 which is displayed on the CRT display 32. The operation sequence diagram program 78 then edits the operation sequence diagram data 82 according to the entered data, thus modifying the operation sequence diagram 86. The operation sequence diagram generating program 78 re-edits the data relative to the operation pattern table 80 according to the entered data. As a result, a new control program is generated on the basis of the updated operation pattern table 80.

Figure 19A:
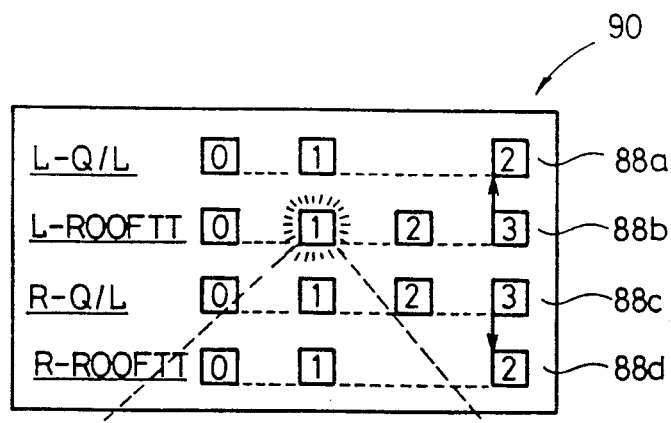
FIGS. 19a through 19d are diagrams showing an operation sequence diagram, an operation detail diagram, an input/output detail diagram, and a layout diagram which are displayed.

The operation sequence diagram 86 may also be displayed as follows:

FIG. 19a shows an operation sequence diagram 90 which displays only the steps of plural tasks 88a through 88d on the CRT display 32 according to an operation sequence thereof, with the step which is being executed being blinked. The tasks 88a through 88d are control programs for controlling units of the object which is controlled by the sequence controller 56. The display of the tasks 88a through 88d may be set up on the basis of the operation sequence diagram data 82 shown in FIG. 17. In the operation sequence diagram 90, upward and downward arrows indicate between the tasks 88a through 88d. Such interlock indications are displayed as follows: When setting up the operation sequence diagram data 82 with respect to the tasks 88a through 88d, it is determined to which tasks 88a through 88d data about the "confirmation of interlock between tasks" in the data area 84 are related. Then, when the operation sequence diagram 90 is displayed, the operation sequence diagram data 82 are set up such that the steps relative to the interlock are vertically arrayed on the CRT display 32.

Figure 19B:
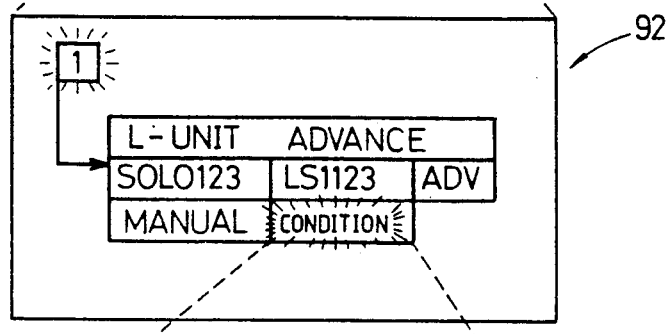

FIG. 19b shows the details of the step which is being blinked in FIG. 19a, as an operation detail diagram 92. The operation detail diagram 92 can be generated using the operation sequence diagram data 82 which are not illustrated in FIG. 19a. The operation detail diagram 92 allows the operator to confirm an actuator relative to the blinked step. Therefore, the operator can determine which actuator is not operated, whether its starting conditions are met, and whether there is an interlock signal applied.

Figure 19C:
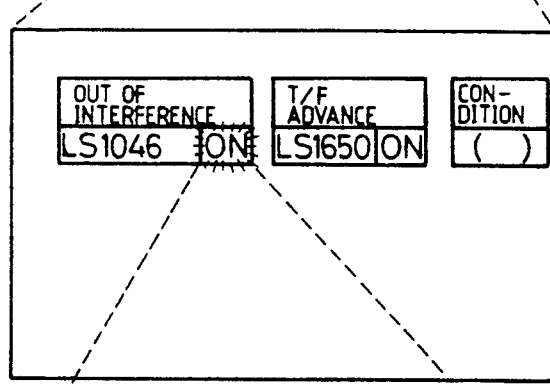

In order for the operator to confirm the details of the data which are being blinked in the operation detail diagram 92, a condition/logic diagram 94 shown in FIG. 19c can be displayed on the CRT display 32. The condition/logic diagram 94 displays the logic conditions of input and output signals and on/off conditions of a limit switch LS, a solenoid SOL, etc. The condition/logic diagram 94 can be generated from the data for displaying the logic chart 68, and allows the operator to know the cause of a failure of the object to be controlled.

Figure 19D:
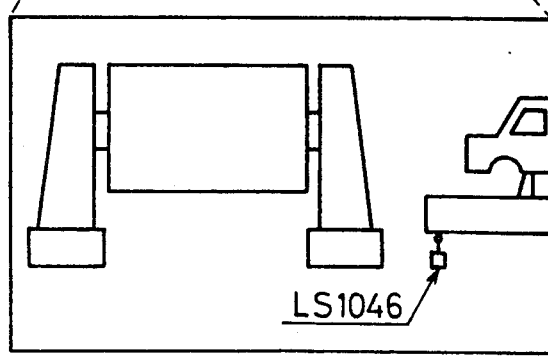

If necessary, the operator can display the position of a failing limit switch LS, which is found in the condition/logic diagram of FIG. 19c, in a layout diagram 96 as shown in FIG. 19d.

With the present invention, as described above, the control program is generated according to the actuator program which describes an operation pattern for an actuator, the step program which describes the stepwise operation of the actuator, and the logic program which describes the logic conditions such as the interlock condition, and the object is controlled according to the control program. Since the individual functions of the control program are separately generated, the efficiency with which each of the programs that make up the control program is generated is very high. Accordingly, even if a complex sequence control process is required, it can be carried out highly accurately. As the control program is divided in a plurality of functions, it can easily be debugged, improved, modified, and corrected. Inasmuch as each of the programs is generated according to operation specifications of the object to be controlled, the operation specifications can directly reflect any alteration of the program or programs.

Moreover, the control program is generated by setting up application parameters of input/output addresses based on the basic operation pattern of an actuator and definition parameters including the label names of elements of the basic operation pattern. The programmer can generate a control program accurately and easily within a short period of time, using the basic operation pattern. Since the same basic operation pattern can be used repeatedly, the number of steps of designing a program is reduced when similar control programs are generated.

A step-wise operation is entered as a timing chart, and a control program is generated on the basis of a step pattern as an operation circuit and time-series step operation data obtained from the timing chart. Therefore, the programmer can generate a control program accurately and easily within a short period of time, using the timing chart. Since each program is generated according to operation specifications of the object to be controlled, the operation characteristics can directly reflect any alteration of the program or programs.

Furthermore, logic expressions such as for interlocks are set up using input conditions composed of condition names, addresses, status data, etc., and a control program is generated on the basis of the logic expressions. Since the programmer sets up the logic expressions while confirming their contents according to the condition names, the control program can be generated accurately and easily. As the control program is established from the logic expressions with the condition names associated therewith, it can easily be debugged, improved, modified, and corrected. Inasmuch as each of the programs is generated according to operation specifications of the object to be controlled, the operation specifications can directly reflect any alteration of the program or programs.

The steps of the object to be controlled, which is made up of a plurality of units, are displayed in a time-series manner based on a control program representing an operation sequence for the object, and the relative relationship between the units of the object is displayed. Accordingly, the operator can understand the flow of operation of the object as a whole on the display screen. The operator can thus design, debug, and monitor the control program efficiently, and can easily grasp the operation status of the object.

In addition, a control program can be generated using common commands shared by a plurality of types of programmable controllers. The operator is therefore not required to be knowledgeable with command languages peculiar to different types of programmable controllers. No special operator is needed for each of programmable controllers concerned. As a result, the control program can be generated, analyzed, and corrected highly easily and quickly. With a common command language used for the control program, even when a different type of programmable controller is employed, the existing control program does not have to be modified so as to match the new programmable controller. Accordingly, the generated control program is highly versatile or compatible. The control program generating apparatus itself is also commonly used with respect to the command language of control programs to be generated thereby, and hence is highly economical and convenient to use.

Although a certain preferred embodiment has been shown and described, it should be understood that many changes and modifications may be made therein without departing from the scope of the appended claims.

What is claimed is:

1. An apparatus for generating a control program, comprising:

generating means for generating an operation sequence for an object to be controlled;

converting means for converting the operation sequence into a control program for controlling said object;

transmitting means for transmitting the control program to a sequence controller for controlling said object;

receiving means for receiving a status signal from said object controlled by the control program, via the sequence controller;

operation sequence diagram generating means for generating an operation sequence diagram from the operation sequence generated by said generating means; and display means for displaying the operation sequence as an operation sequence diagram including a time-series display of each step of the object which includes a plurality of units and a relative display of the plurality of units, and for displaying an operation status of said object on the operation sequence diagram.

2. The apparatus of claim 1, wherein said display means includes, hierarchical display means for selectively or simultaneously displaying a first display including each step of the plurality units, a second display including operation details of each step, and a third display including conditions and logic of the operation details.

3. The apparatus of claim 1, wherein said operation sequence diagram generating means includes operation sequence diagram data storing means for storing operation sequence diagram data and step-wise operation data of the plurality of units of the object which are arranged in data area according to interlocks between the plurality of units.

4. The apparatus of claim 3, further comprising editing means for editing the operation sequence diagram data and the step-wise operation data in said operation sequence data storing means according to the operation sequence diagram.

5. An apparatus for generating a control program, comprising:
    program input means for entering a common control program for a plurality of types of programmable controllers;
    command storing means for storing commands for the plurality of types of programmable controllers, said commands corresponding to commands of the control program;
    selecting means for selecting one type of the plurality of types of programmable controllers;
    command selecting means for selecting commands from said command storing means, which correspond to the selected type of programmable controller; and
    means for generating the control program for the selected type of programmable controller based on the commands selected by said command selecting means.

6. The apparatus of claim 5, wherein said command storing means includes means for storing a plurality of commands for the plurality of types of programmable controllers which correspond to one macro command of the control program.

7. A method of generating a control program for controlling at least one machine tool having a plurality of actuators, comprising the steps of:
    (a) generating an actuator program which defines an input/output relationship for each of the plurality of actuators of the machine tool to be controlled, based on a corresponding basic operation pattern, stored in a memory, including the sub-steps of,
    (a) (1) assigning the corresponding basic operation patterns to each of the plurality of actuators, and assigning definition parameters as attributes, including label names of elements of the corresponding basic operation patterns to each of the plurality of actuators, and,
    (b) (2) selecting one of the corresponding basic operation patterns for at least one of the plurality of actuators of said machine tool to be controlled, and assigning, as application parameters, input/output addresses to the label names of elements of the selected basic operation patterns;
    (b) generating a step program which defines a step-wise operation of each of the plurality of actuators, including the substeps of,
    (b) (1) selecting a step pattern from a plurality of step patterns stored in the memory as an operation circuit for incrementing steps of said control program, and
    (b) (2) generating a timing chart, using a step-wise operation of each of the plurality of actuators of said machine tool, and generating time-series step-wise operation data from the timing chart and the step pattern; and
    (c) generating a logic program which defines logic conditions including an interlock condition, including the sub-steps of,
    (c) (1) setting input conditions including condition names, addresses, and status data, and
    (c) (2) defining logic expressions including interlock expressions using the input conditions;
    wherein said control program is composed of said actuator program, said step program, and said logic program which are stored in a program memory.

8. The method of claim 7, wherein the input conditions are set up as an I/O table, and the logic expressions are defined using the I/O table.

9. An apparatus for generating a control program for controlling at least one machine tool having a plurality of actuators, comprising:
    first memory means for storing basic operation patterns for each of the plurality of actuators and definition parameters, as attributes, including label names of elements of the basic operation patterns;
    first assigning means for assigning the basic operation patterns and the definition parameters, selecting one of the basic operation patterns for at least one of the plurality actuators of said machine tool to be controlled, and assigning, as application parameters, input/output addresses to the label names of the elements of the selected basic operation patterns;
    first program editing means for editing the control program based on the basic operation patterns, the definition parameters, and the application parameters;
    second memory means for storing a step pattern as an operation circuit of incrementing steps of the control program;
    second assigning means for assigning the sep pattern and generating a timing chart for a step-wise operation of each of the plurality of actuators of said machine tool;
    second program editing means for editing the control program based on the timing chart and the step pattern;
    third assigning means for assigning input conditions including condition names, addresses, and status data, and for defining logic expressions including interlock expressions using the input conditions; and
    third program editing means for editing the control program based on said logic expressions.

10. The apparatus of claim 9, further comprising:
    supervising means for supervising execution of the control program for said machine tool.

* * * * *